United States Patent [19]

Mehrotra et al.

[11] Patent Number: 4,959,332
[45] Date of Patent: * Sep. 25, 1990

[54] ALUMINA-ZIRCONIA-CARBIDE WHISKER REINFORCED CUTTING TOOLS

[75] Inventors: Pankaj K. Mehrotra; Elizabeth R. Billman, both of Greensburg, Pa.

[73] Assignee: Kennametal Inc., Latrobe, Pa.

[*] Notice: The portion of the term of this patent subsequent to Sep. 25, 2007 has been disclaimed.

[21] Appl. No.: 266,719

[22] Filed: Nov. 3, 1988

[51] Int. Cl.$^5$ .............................................. C04B 35/56
[52] U.S. Cl. ........................................ 501/89; 51/309
[58] Field of Search ............................ 501/89; 51/309; 407/119; 408/144

[56] References Cited

U.S. PATENT DOCUMENTS

| | | | |
|---|---|---|---|
| 4,218,253 | 8/1980 | Dworak et al. | 106/43 |
| 4,292,049 | 9/1981 | Tanaka et al. | 51/309 |
| 4,298,385 | 11/1981 | Claussen et al. | 501/105 |
| 4,316,964 | 2/1982 | Lanse | 501/105 |
| 4,331,048 | 5/1982 | Dworak et al. | 82/1 |
| 4,366,254 | 12/1982 | Rich et al. | 501/89 |
| 4,419,311 | 12/1983 | Claussen et al. | 264/60 |
| 4,421,861 | 12/1983 | Claussen et al. | 501/103 |
| 4,506,024 | 3/1985 | Claussen et al. | 501/105 |
| 4,507,224 | 3/1985 | Toibana et al. | 252/516 |
| 4,543,343 | 9/1985 | Iyori et al. | 501/87 |
| 4,543,345 | 9/1985 | Wei et al. | 501/95 |
| 4,657,877 | 4/1987 | Becher et al. | 501/89 |
| 4,745,091 | 5/1988 | Landingham | 501/87 |
| 4,746,635 | 5/1988 | Inoue et al. | 501/89 |
| 4,749,667 | 6/1988 | Jun et al. | 501/89 |
| 4,767,727 | 8/1988 | Claussen et al. | 501/87 |
| 4,770,673 | 9/1988 | Ketcham et al. | 51/309 |
| 4,789,277 | 12/1988 | Rhodes et al. | 409/131 |
| 4,801,510 | 1/1989 | Mehrotra et al. | 428/698 |
| 4,820,663 | 4/1989 | Mehrotra et al. | 501/87 |
| 4,852,999 | 8/1989 | Mehrotra et al. | 51/309 |

FOREIGN PATENT DOCUMENTS

| | | |
|---|---|---|
| 0194811 | 9/1986 | European Pat. Off. |
| 0202504 | 11/1986 | European Pat. Off. |
| 0208910 | 1/1987 | European Pat. Off. |
| 0252046 | 1/1988 | European Pat. Off. |
| 62-265182 | 11/1987 | Japan |
| 63-30378 | 2/1988 | Japan |
| WO86-05480 | 9/1986 | World Int. Prop. O. |

OTHER PUBLICATIONS

Buljan, S. T. et al., "Ceramic Whisker-and Particulate-Composites: Properties, Reliability, and Applications," Ceramic Bulletin, vol. 68, No. 2, (1989), pp. 387-394.

"Felomuhle SPK Tools Fast & Safe," Advertisement, (9/1981).

Gruss, W. W., "Turnins of Steel With Ceramic Cutting Tools," Tool Materials for High Speed Machining, (Proceedings Held Feb. 25-27, 1987, Scottsdale, AZ), (1987), pp. 105-115.

Whitney, E. D. et al., "Engineered Ceramics for High Speed Machining," (Proceedings Feb. 25-27, 1987, Scottsdale, AZ), (1987), pp. 77-82.

Becher et al., "Transformation Toughened and Whisker Reinforced Ceramics," Soc. of Automotive Engineers, Proc. 21st Auto. Techn. Dev. Meeting, Mar. 1984, pp. 201-205.

Stevens "An Introduction to Zirconia-Zirconia and Zirconia Ceramics," Magnesium Elektron Ltd., (1986).

"Multitoughening Ceramic," Techno Japan, vol. 19, No. 10, Oct. 1986.

"60 Year Old Grows Whiskers," Metal Powder Report, Jul. 1986.

(List continued on next page.)

Primary Examiner—William R. Dixon, Jr.
Assistant Examiner—Deborah Jones
Attorney, Agent, or Firm—John J. Prizzi

[57] ABSTRACT

A metalcutting insert is provided with an alumina based ceramic composition composed of (in volume percent, v/o): about 1.5 to 12.5 silicon carbide whiskers and about 7.5 to 17.5 v/o zirconia. The silicon carbide whiskers and zirconia are substantially homogeneously distributed in an alumina base matrix. Preferably, at least about 7 v/o of the alumina based ceramic composition is tetragonal zirconia.

64 Claims, 1 Drawing Sheet

OTHER PUBLICATIONS

E. L. Exner et al., "Sic Whisker Reinforced $Al_2O_3$—$ZrO_2$ Composites," Ceram. Eng. Sci. Proc., 9 [7–8], pp. 597–602, (1988).

Clausen et al., "Whisker-Reinforced Oxide Ceramics," Journal de Physique Colloque C1, Supplement No. 2, Tome 47, Feb. 1986, pp. C1–693 to C1–702.

Grewe et al., "Whisker Reinforced Ceramics," Ceramic Forum Int'l, Aug./Sep. 1987, pp. 303–317.

Becher et al., "Toughening of Ceramics by Whisker Reinforcement," Fracture Mechanics of Ceramics, (Proceedings of Conf. held 6–19–21, 1985 Virginia) Ed. by Bradt et al. Plenum Press, N.Y., (1986), pp. 61–73.

Porter et al., "Microstructural Development in MgO—Partially Stabilized Zirconia (Mg-PSZ)," Journal of Am. Ceramic Society, vol. 62, No. 5–6, May–Jun. 1979, pp. 298–305.

Claussen, "Fracture Toughness of $Al_2O_3$ With an Unstabilizied $ZrO_2$ Dispersed Phase," Journal of the American Society, vol. 59(1–2), pp. 49–51.

Japan Ceramic News, vol. 1, No. 10, (12/10/87), pp. 1,2.

American National Standard for Cutting Tools, Ansi B212.4–1986.

Metal Working News, Oct. 3, 1988, "Greenleaf Makes Ceramic Cutting Insert."

N. Claussen, "Stress Induced Transformation of Tetragonal $ZrO_2$ Particles in Ceramic Matrices," Am. Cer. Soc. Journal, vol. 61, No. 1–2 (1978) pp. 85, 86.

"Phase Diagrams for Ceramists," Amer. Cer. Soc. (1975 Supp.) pp. 117, 163 & 166.

Claussen et al., "Phase Transformation of Solid Solutions of $ZrO_2$ & $HfO_2$ in an $Al_2O_3$ Matrix," Sci. & Tech. of Zirconia, Advances in Ceramics, vol. 3, Eds. A. H. Heuer & L. W. Hobbs, Am. Cer. Soc. (1981) pp. 164–166.

Tien et al., "Toughened Ceramics in the System $Al_2O_3$: $Cr_2O_3$/$ZrO_2$: $HfO_2$", Int. J. High Tech. Ceramics 2 (1986) pp. 207–219.

E. R. Billman et al., "Machining With $Al_2O_3$—SiC—Whisker Cutting Tools," Ceramic Society Bulletin, vol. 67, No. 6, 1988, pp. 1016–1019.

ALUMINA-ZIRCONIA-CARBIDE WHISKER REINFORCED CUTTING TOOLS

BACKGROUND OF THE INVENTION

The present invention relates to alumina based ceramic cutting tools containing zirconia. It especially relates to ceramic cutting tools useful in the high speed, rough machining of soft steels.

In the past, zirconia has been added in specified amounts to selected alumina-silicon carbide whisker reinforced compositions described in U.S. Pat. Nos. 4,534,345 and 4,507,224 to provide enhanced fracture toughness and/or flexural strength (see U.S. Pat. Nos. 4,657,877 and 4,749,667; Japanese Patent Publication No. Sho 62-265182; Clausen et al, "Whisker-Reinforced Oxide Ceramics,"Jouranl de Physique Colloque Cl, Supplement au No. 2, Tome 47, February 1986, Pages Cl-693 to Cl-702; Becher et al, "Toughening of Ceramics by Whisker Reinforcement," Fracture Mechanics of Ceramics 7, et. by Bradt et al, Pneum Press, New York (1986), Pages 61–73).

It has been indicated that the zirconia should be in the monoclinic and/or (metastable) tetragonal phase to obtain improved fracture toughness and/or flexural strength. It has been further indicated that the metastable tetragonal phase is obtained by reducing zirconia particle size or through the use of a cubic zirconia stabilization promoter such as yttria, calcia, magnesia and the rare earth oxides in amounts below that required to fully stabilize the cubic zirconia phase.

Cutting tools composed of a variety of compositions containing alumina, zirconia and silicon carbide whiskers with or without other additives have been proposed (see European Patent Application No. 86107916.8 (published Jan. 21, 1987 as No. 0208910); U.S. Pat. No. 4,749,667; "Multitoughening Ceramic," Techno Japan, Vol. 19, No. 10, Oct. 1986, Page 78; and European Patent Application No. 86301597.0 published Sept. 17, 1986, as No. 0194811).

Where an indication is given as to the material being cut by these tools, these tools have been applied to the machining of cast irons, hardened steels and nickel based superalloys. These are all materials that have relatively low reactivity with the silicon carbide in the cutting insert at the high temperatures encountered during metalcutting. None of the foregoing documents teaches or suggests that for metalcutting inserts for use in the high speed roughing of soft steels, cutting performance can be significantly improved by controlling the alumina based ceramic composition to within the combination of critical ranges now discovered by the applicants.

BRIEF SUMMARY OF THE INVENTION

In accordance with the present invention, alumina based ceramic cutting inserts are provided containing (in volume percent, v/o) about 1.5 to 12.5 v/o silicon carbide whiskers, about 7.5 to 17.5 v/o zirconia dispersed in an alumina based matrix. The alumina based ceramic composition contains tetragonal zirconia in an amount effective to provide a cutting edge with a lifetime of at least about 10 minutes, preferably at least about 12 minutes, and more preferably at least 15 minutes, when turning AISI 1045 steel having a hardness in the range of about 190-200 BHN under the conditions of 1000 surface feet/minute, 0.025 inch/revolution and 0.100 inch depth of cut.

Preferably, at least about 7 v/o of the composition is tetragonal zirconia. More preferably, at least about 7.5 v/o, and most preferably, at least about 8 v/o of the ceramic composition is tetragonal zirconia.

Preferably, the silicon carbide whisker content is held between about 2.5 to 12.5 v/o, and more preferably, 2.5 to 11 v/o, and most preferably about 2.5 to 7.5 v/o. The zirconia content is preferably held between about 9 and 16 v/o.

The present alumina based ceramic contains at least 40 v/o alumina and, preferably, at least about 50 v/o alumina.

These and other aspects of the present invention will become more apparent upon review of the detailed description of the present invention in conjunction with the figures briefly described below:

DETAILED DESCRIPTION OF THE INVENTION

Figure 1:
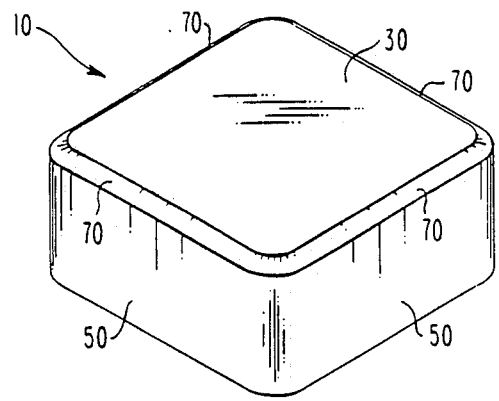
FIG. 1 is an isometric view of an embodiment of a square cutting insert in accordance with the present invention.

In the present invention, a preferred embodiment of which is shown in FIG. 1, a metalcutting insert 10 is provided having a rake face 30, a flank face 50 and a cutting edge 70 at the juncture of the rake and flank faces. Preferably, the cutting edge 70 is preferably in a chamfered condition (e.g., K-land). The cutting insert is composed of an alumina-silicon carbide whisker-zirconia composition in accordance with the present invention.

The present invention will become more clear upon consideration of the following examples. Provided below, in Table I, is a listing of the alumina-silicon carbide whisker-zirconia compositions tested and their hot pressing temperatures.

Each mix was typically made by blending $Al_2O_3$ (ALCOA grade A16SG, >99% pure) and $ZrO_2$ (Zircar unstabilized) slurries together for one hour in a jar mill in the presence of about 4 kilograms of alumina cycloids. A sonicated silicon carbide whisker (Tokai Carbon Co., Tokyo, Japan—TOKAWHISKER (TOKAMAX) Grade 2, >97% pure) slurry was then added, and the whole mix was blended for one hour. $Al_2O_3$ and $ZrO_2$ slurries had previously been milled sufficiently to obtain mean particle sizes of 0.5 to 0.6 $\mu$m and 0.6 to 0.8 $\mu$m, respectively (corresponding specific surface areas measured by BET were 10 to 14 $m^2/g$ and 20 to 40 $m^2/g$, respectively). The silicon carbide whiskers had a diameter of about 0.3 to 0.7 $\mu$m and a length of about 5 to 50 $\mu$m. All slurries were made in isopropyl alcohol, with the final slurry consisting of about 25 to 30 w/o solid. The blended slurries were dried in a pan, and the resulting powder was screened through a 100 mesh screen. Fully dense (>98% of the theoretical density) billets of these compositions were obtained by uniaxially hot pressing in a graphite mold at 1500 to 1800° C. temperature (see Table I), and a pressure of about 4000 to 5000 psi under argon. Samples were cut from these billets for evaluating physical and mechanical properties, and preparing inserts for metalcutting tests.

TABLE I

| Mix No. | Hot Pressing Temp.(°C.) | Composition | |
|---|---|---|---|
| | | v/o SiC$_w$ | v/o ZrO$_2$ |
| 1 | 1650 | 5 | 5 |
| 2 | 1570 | 10 | 5 |
| 3 | 1650 | 15 | 5 |
| 4 | 1650 | 25 | 5 |
| 5 | 1700 | 35 | 5 |
| 6 | 1540 | 5 | 7.5 |
| 7 | 1510 | 0 | 10 |
| 8 | 1540 | 2.5 | 10 |
| 9 | 1650 | 5 | 10 |
| 10 | 1540 | 7.5 | 10 |
| 11 | 1550 | 10 | 10 |
| 12 | 1550 | 12.5 | 10 |
| 13 | 1555 | 15 | 10 |
| 14 | 1550 | 17.5 | 10 |
| 15 | 1550 | 20 | 10 |
| 16 | 1650 | 30 | 10 |
| 17 | 1700 | 35 | 10 |
| 18 | 1540 | 5 | 12.5 |
| 19 | 1510 | 0 | 15 |
| 20 | 1530 | 2.5 | 15 |
| 21 | 1555 | 5 | 15 |
| 22 | 1520 | 7.5 | 15 |
| 23 | 1550 | 15 | 15 |
| 24 | 1600 | 20 | 15 |
| 25 | 1650 | 30 | 15 |
| 26 | 1740 | 35 | 15 |
| 27 | 1530 | 5 | 17.5 |
| 28 | 1650 | 5 | 20 |
| 29 | 1550 | 15 | 20 |
| 30 | 1575 | 25 | 20 |
| 31 | 1700 | 35 | 20 |
| 32 | 1800 | 15 | 0 |
| 33 | 1800 | 20 | 0 |
| 34 | 1800 | 25 | 0 |
| 35 | 1800 | 30 | 0 |
| 36 | 1800 | 35 | 0 |

TABLE II

| Mix No. | Composition | | RA Hardness | Fracture Toughness $K_{IC}$(E&C) (MPam$^{\frac{1}{2}}$) | Tetragonal ZrO$_2$ as v/o of Composite |
|---|---|---|---|---|---|
| | v/oSiC$_w$ | v/oZrO$_2$ | | | |
| 1 | 5 | 5 | 93.1 | 5.04 | 3.8 g |
| 2 | 10 | 5 | 93.8 | 5.38 | 4.7 |
| 3 | 15 | 5 | 93.9 | 5.36 | 3.3 g |
| 4 | 25 | 5 | 94.3 | 5.52 | 1.3 g |
| 5 | 35 | 5 | 94.6 | 5.88 | 1.6 g |
| 6 | 5 | 7.5 | 93.8 | 4.9 | 7 |
| 7 | 0 | 10 | 93.9 | 4.63 | 9.4 |
| 8 | 2.5 | 10 | 93.7 | 4.80 | 9.4 |
| 9 | 5 | 10 | 93.2 | 5.43 | 7.9 |
| 10 | 7.5 | 10 | 93.8 | 5.49 | 9.0 |
| 11 | 10 | 10 | 93.7 | 6.23 | 5.5 g, 8.4 |
| 12 | 12.5 | 10 | 94.0 | 5.73 | 6.3 |
| 13 | 15 | 10 | 94.2 | 6.19 | 8.5 |
| 14 | 17.5 | 10 | 94.0 | 6.13 | 4.9 |
| 15 | 20 | 10 | 93.8 | 6.27 | 4.5 g |
| 16 | 30 | 10 | 94.0 | 5.86 | 2.8 g |
| 17 | 35 | 10 | 94.6 | 6.09 | — |
| 18 | 5 | 12.5 | 93.8 | 5.80 | 10.7 |
| 19 | 0 | 15 | 93.6 | 5.29 | 11.9 |
| 20 | 2.5 | 15 | 93.6 | 5.66 | 10.2 |
| 21 | 5 | 15 | 93.5 | 6.06 | 11.4 |
| 22 | 7.5 | 15 | 93.6 | 5.81 | 10.7 |
| 23 | 15 | 15 | 94.0 | 6.56 | 5.9 |
| 24 | 20 | 15 | 94 | 6.99 | 3.4 g, 5.9 |
| 25 | 30 | 15 | 93.6 | 6.28 | 1.9 g |
| 26 | 35 | 15 | 94.1 | 6.08 | — |
| 27 | 5 | 17.5 | 93.3 | 5.27 | 8.5 |
| 28 | 5 | 20 | 90.4 | 5.46 | 1.4 g |
| 29 | 15 | 20 | 93.2 | 6.16 | 1.2 g, 3.8 |
| 30 | 25 | 20 | 93.5 | 6.49 | 2.0 g, 2.5 |
| 31 | 35 | 20 | 93.4 | 6.39 | 1.8 g |
| 32 | 15 | 0 | 93.7 | 5.21 | — |
| 33 | 20 | 0 | 93.9 | 5.13 | — |
| 34 | 25 | 0 | 94.9 | 5.66 | — |
| 35 | 30 | 0 | 94.9 | 5.37 | — |
| 36 | 35 | 0 | 95.0 | 5.65 | — |

Table II shows the Rockwell A (RA) hardness fracture toughness and tetragonal zirconia content of the densified mixes. In accordance with the present invention, Rockwell A hardness is preferably at least 93, and more preferably, at least 93.5 Rockwell A. Fracture toughness ($K_{IC}$) was measured on a polished surface employing the Palmqvist indentation technique using a 18.5 kg load and a Vickers indenter (see Evans and Charles, "Fracture Toughness Determination by Indentation," J. Amer. Ceramic Soc., Vol. 59, No. 7-8, Pages 371,372) and is preferably at least 5 MPam$^{\frac{1}{2}}$.

ZrO$_2$, which has a monoclinic (m) crystal equilibrium structure at room temperature goes through phase changes. When heated above about approximately 1200° C., ZrO$_2$ transforms to a tetragonal (t) phase, which can be retained at the room temperature in a metastable state either via chemical alloying (for example, with Y$_2$O$_3$) or by keeping the particle size sufficiently small. There is about 4% volume increase as tetragonal ZrO$_2$ transforms to its monoclinic phase, which results in reduced tensile stresses and increased fracture toughness: the so called "transformation toughening." Spontaneous transformation of ZrO$_2$ to its monoclinic form during polishing or grinding may occur due to stress induced transformation thereby generating surface compressive stresses. The Porter-Heuer (Porter et al, J. Amer. Ceramic Soc., Vol. 62, No. 5-6 (1979) Pages 298-305) formula was modified and used to estimate the fraction of monoclinic ZrO$_2$ (Vm) from peak intensities of the 111 reflection of the monoclinic ZrO$_2$ (Im(111)), and 111 reflection of the tetragonal ZrO$_2$ (It(111)):

$$Vm = \frac{1.603 \, Im \, (111)}{1.603 \, Im \, (111) + It \, (111)} \quad (1)$$

and $$Vt = 1 - Vm \quad (2)$$

where Vt is the fraction of ZrO$_2$ which is tetragonal ZrO$_2$

The volume fraction of tetragonal ZrO$_2$ in the whole composite (vt) is estimated as follows:

$$vt = Vt \, vz \quad (3)$$

where vz is the volume fraction of the total ZrO$_2$ added in the mix. The above relationship assumes that ZrO$_2$ substantially remains unchanged during consolidation except for the phase transformation discussed above.

Since a surface has to be cut, ground or polished for x-ray diffraction, fracture toughness measurement or other evaluations, some tetragonal ZrO$_2$ on the surface transforms to the monoclinic phase as a result of this mechanical working. In that respect, a polished surface should provide a tetragonal ZrO$_2$ content which is closer to the value of the interior of the material than a ground surface, since the former is inherently relatively gentle. A comparison of Vt and vt values on ground and polished surfaces was made. It was found that the polished surfaces show a larger amount of tetragonal $ZrO_2$ than the ground surfaces. It appears that this increase is roughly about 2.5 v/o on average for vt. In table II, the volume percent of tetragonal zirconia measured on a ground surface is followed by: g. In all other cases, the volume percent tetragonal was measured on a polished surface.

We have found that both Vt and vt decrease with increasing silicon carbide whisker content. As the silicon carbide whisker content increases, the thermal expansion coefficient of the $Al_2O_3$-SiCw matrix decreases which reduces the critical particle size of $ZrO_2$; that is, $ZrO_2$ particles larger than this critical size will spontaneously transform to the monoclinic structure on cooling to the room temperature after hot pressing. vt increases with $ZrO_2$ content for low levels of $ZrO_2$, goes through a maximum, and then decreases with further increases in the $ZrO_2$ level.

TABLE III

TURNING AISI 1045 STEEL (about 190 to 200 BHN)

| Insert Material | Cutting Edge Life & Failure Mode | Average Life (Minutes) |
|---|---|---|
| Mix 1 | 2(BK) 0.25(BK) | 1.1 |
| 2 | — | — |
| 3 | 10.5(CH) 7(BK) 10.9(DN) 6.2(BK) | 8.7 |
| 4 | 7(BK) 3.9(BK) 7(CH) | 6 |
| 5 | 0.5(CR) 0.6(CR) | 0.6 |
| 6 | 10(DN) 5(DN) | 7.5 |
| 7 | 7(BK) 20(BK) | 13.5 |
| 8 | 12.5(BK) 20(DN,BK) | 16.3 |
| 9 | 11.3(DN) 25.5(FW) | 18.4 |
| 10 | 13(BK) 11(BK) | 12 |
| 11 | 10.7(DN) 19.2(FW) 14(BK) 14.7(BK) | 14.7 |
| 12 | — | — |
| 13 | 6.6(DN) 16.1(BK) | 11.4 |
| 14 | — | — |
| 16 | 4 (CR) 0.7(CR) | 2.4 |
| 17 | — | — |
| 18 | 16.8(DN) 8.5(DN) | 12.7 |
| 19 | 16.2(DN) 15.1(DN) | 15.7 |
| 20 | 12(CH) 13.8(DN) | 12.9 |
| 21 | 14(BK) 21.7(DN) | 17.9 |
| 22 | 15.4(DN) 15(BK) | 15.2 |
| 23 | — | — |
| 24 | 3.2(DN) 6.8(DN) | 5 |
| 25 | 2.1(DN) 2.7(DN) | 2.4 |
| 26 | — | — |
| 27 | 12.6(DN) 16.2(BK) | 14.4 |
| 28 | 0.6(DN) 0.7(DN) | 0.7 |
| 29 | 3.5(BK) 4(DN) | 3.8 |
| 30 | 3(DN) 4.9(DN) | 4.0 |
| 31 | 1.1(CR-DN) 0.7(CR) | 0.9 |
| 32 | 6.6(DN) 5.0(CH)* | 5.8 |
| 33 | <.5(DN) 4.0(BK)* | 2.25 |
| 34 | 9.5(CH) 1.0(CR-BK)* | 5.25 |
| 35 | 0.6(CR) 1.4(BK)* | 1.0 |
| 36 | <.5(CR) 0.3(BK)* | 0.4 |

Test Conditions
100 sfm (surface feet/minute)
0.025 ipr (inch/revolution) (*second test ran at 0.024 ipr)
0.100 inch doc (depth of cut)
SNGN-453T (American National Standard Designation in accordance with ANSI B212.4-1986) indexable cutting insert style
(cutting edge preparation: 0.008 inch × 20° K-land)
15° lead angle (side cutting edge angle)
−5° side rake angle
−5° back rake angle
no coolant
Cutting Edge Life Criteria
FW - .015 inch uniform flank wear
MW - .030 inch concentrated flank wear
CR - .004 inch crater wear
DN - .030 inch depth of cut notch
CH - .030 inch concentrated wear or chipping
BK - breakage
AISI 1045 is equivalent to Unified Numbering System (UNS) Designation - G10450.

AISI 1045 is equivalent to Unified Numbering System (UNS) Designation—G10450.

Indexable insert cutting edge lifetimes in the high speed roughing of a premachined AISI 1045 steel are shown in Table III. Cutting edge lifetimes are plotted as a function of the silicon carbide whisker content in FIG. 2. It can be seen that cutting edge lifetime appears to initially increase with increasing silicon carbide whisker content. The silicon carbide whisker level at which the maximum is reached appears to be a function of the $ZrO_2$ level. The maximum in tool life occurred at about 10 to 15 v/o $ZrO_2$ content. It was found that at high levels of silicon carbide whiskers, tool life ends predominantly by crater wear, probably due to a rapid chemical reaction between iron and SiC. High levels of $ZrO_2$ resulted in a lowered hardness which caused tool failure to occur by depth-of-cut notch. Breakage and chipping were the dominant failure modes for tools which were relatively low in both silicon carbide whisker and $ZrO_2$ contents, probably due to the low fracture toughnesses of these compositions.

Of the several physical and mechanical parameters described above, the volume percent of the composite which is tetragonal $ZrO_2$ was found to correlate directly with cutting edge lifetime. That is, as the volume percent of tetragonal zirconia in the mix increased, the cutting edge lifetime also increased. We believe that the reason for this behavior is probably that, since the fracture resistance is predominantly obtained by transformation toughening, a high level of tetragonal zirconia provides increased fracture resistance and tool life. We also believe that a low level of silicon carbide whisker is needed to minimize chemical wear, maximize the amount of tetragonal zirconia, and compensate for the hardness loss due to the addition of $ZrO_2$.

The foregoing description of the present invention demonstrates that for maximizing cutting edge lifetime in machining soft plain carbon steels the tool material should comprise about 1.5 to 12.5 v/o silicon carbide whisker, about 7.5 to 17.5 v/o $ZrO_2$ in a matrix comprising $Al_2O_3$. The preferred ranges are about 2.5 to 11 v/o silicon carbide whisker and 9 to 16 v/o $ZrO_2$. Furthermore, preferably at least about 7 v/o of the composite should be in the form of tetragonal $ZrO_2$. Cutting tool compositions containing more than 17.5 v/o ZrO2 may be too soft and may prematurely fail by excessive wear, whereas increasing silicon carbide whisker levels may result in higher chemical wear and reduction in the level of tetragonal zirconia causing cutting edge lifetime to decrease.

Figure 2:
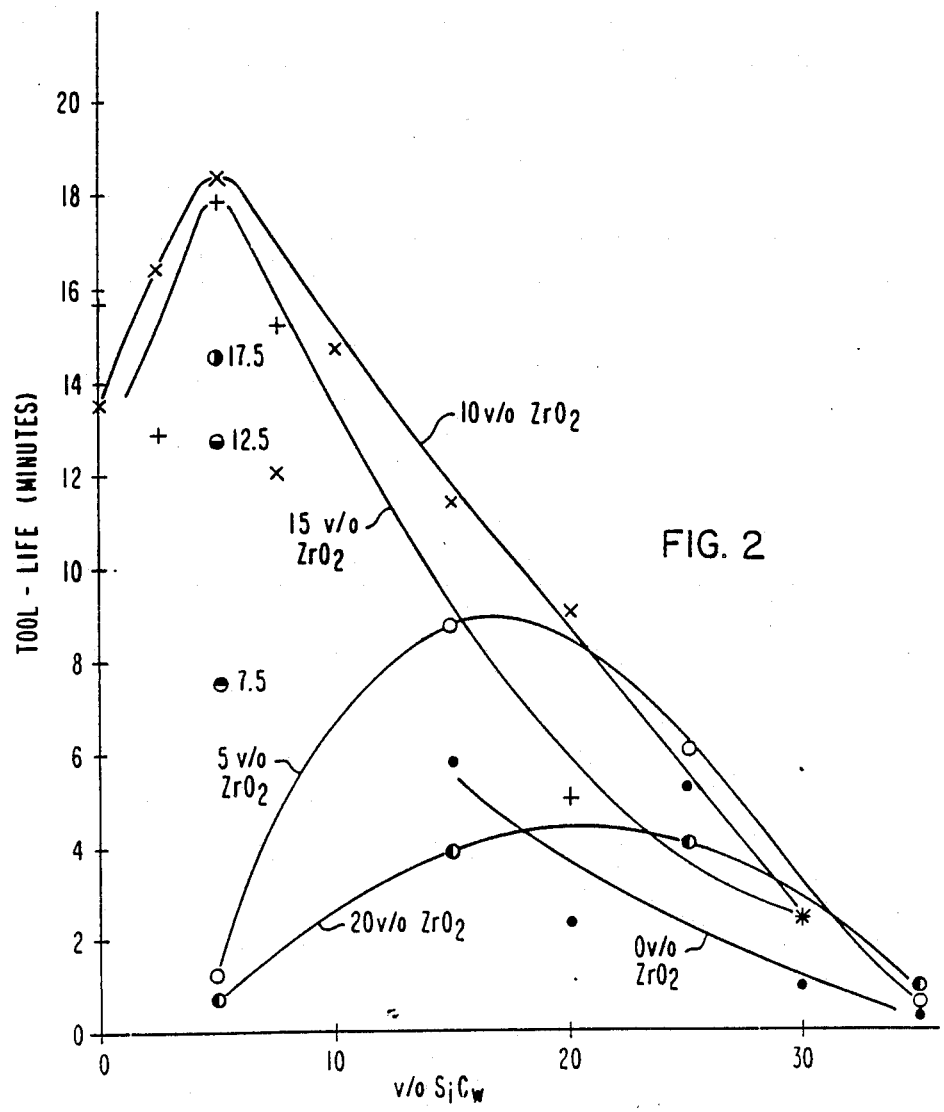
FIG. 2 is a graph of metalcutting insert lifetime in the high speed roughing of AISI 1045 steel as a function of the silicon carbide whisker content at various zirconia contents.

As can be seen in FIG. 2, cutting edge lifetime increases as silicon carbide whiskers are added at the 2.5 to 5 v/o level, with the maximum occurring at about 5 v/o. Above about 5 v/o silicon carbide whiskers, the cutting edge lifetime appears to decrease. Therefore, most preferably, the maximum silicon carbide whisker content is about 5 to 7.5 v/o.

In another embodiment of the present invention, titanium carbide, as whiskers and/or substantially equiaxed particulate, may be added in an amount of about 1.5 to 37.5 v/o, preferably 2 to 35 v/o of the composition and, more preferably, about 10 to 30 v/o in addition to, or in partial replacement of, silicon carbide whiskers.

In still another embodiment of the present invention, titanium carbide whiskers alone, or in combination with substantially equiaxed titanium carbide particles, at levels of 1.5 to 37.5 v/o, and preferably 10 to 30 v/o, may completely replace the silicon carbide whiskers used herein.

Titanium carbide has a higher thermal expansion coefficient than alumina. It is, therefore, believed that titanium carbide additions should allow more tetragonal zirconia to be retained at room temperature. In addition, titanium carbide, while not as hard as silicon carbide, is significantly less reactive than silicon carbide is with iron at the elevated temperatures encountered in metalcutting. Titanium carbide whiskers may be manufactured and harvested by the methods described in A. Kato et al, "*Growth Rate of Titanium Carbide Whiskers in Chemical Vapor Deposition,*" J. Crvst. Growth, 37 (1977), Pages 293-300; and N. Tamari et al, "*Catalytic Effects of Various Metals and Refractory Oxides on the Growth of TiC Whiskers by Chemical Vapor Deposition,*" J. Crvst. Growth, 46 (1979), Pages 221-237. Titanium carbide whiskers and their incorporation and use in alumina based cutting inserts are disclosed in Mehrotra et al U.S. Pat. application Ser. No. 056,091, filed May 28, 1987, and assigned to Kennametal Inc. now U.S. Pat. No. 4,852,999.

Other embodiments of the present invention may be found in P. K. Mehrotra et al U.S. Pat. application Ser. No. 266,721 assigned to the assignee herein and filed concurrently with the present application. This application demonstrates that further improvements in cutting edge lifetime may be obtained if magnesia is added to the present compositions (containing titanium carbide and/or silicon carbide whiskers) in the range of 0.03 to 3 v/o and, most preferably, at about 0.04 to 1 v/o of the composition.

All patents, patent applications and documents referred to herein are hereby incorporated by reference.

As claimed herein, the tetragonal zirconia levels claimed are those estimated from x-ray diffraction of a polished surface by the technique described herein.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

WHAT IS CLAIMED IS:

1. A metalcutting insert comprising:
    a rake face;
    a flank face;
    a cutting edge at a juncture of said rake face and said flank face;
    and said metalcutting insert having an alumina based ceramic composition consisting essentially of about 1.5 to 12.5 v/o silicon carbide whiskers, about 7.5 to 17.5 v/o zirconia, wherein at least about 7 v/o of said composition is tetragonal zirconia, and wherein said silicon carbide whiskers and zirconia are dispsersed in an aluminia based matrix.

2. The metalcutting insert according to claim 1 wherein said silicon carbide whiskers are present at a level of about 2.5 to 11 v/o.

3. The metalcutting insert according to claim 2 wherein said zirconia is present at a level of about 9 to 16 v/o.

4. The metalcutting insert according to claim 3 wherein said tetragonal zirconia is present at a level of at least about 7.5 v/o.

5. The metalcutting insert according to claim 3 wherein said tetragonal zirconia is present at a level of at least about 8 v/o.

6. The metalcutting insert according to claim 1 wherein said silicon carbide whiskers are present at a level of about 2.5 to 7.5 v/o.

7. The metalcutting insert according to claim 6 wherein said zirconia is present at a level of about 9 to 16 v/o.

8. The metalcutting insert according to claim 7 wherein said tetragonal zirconia is present at a level of at least about 7.5 v/o.

9. The metalcutting insert according to claim 4 wherein said tetragonal zirconia is present at a level of at least about 8 v/o.

10. The metalcutting insert according to claim 1 wherein said zirconia is present at a level of about 9 to 16 v/o.

11. The metalcutting insert according to claim 10 wherein said tetragonal zirconia is present at a level of at least about 7.5 v//o.

12. The metalcutting insert according to claim 10 wherein said tetragonal zirconia is present at a level of at least about 8 v/o.

13. The metalcutting insert according to claim 10 wherein said silicon carbide whiskers are present at a level of about 1.5 v/o.

14. The metalcutting insert according to claim 10 wherein said silicon carbide whiskers are present at a level of about 2.5 v/o.

15. The metalcutting insert according to claim 1 wherein said silicon carbide whiskers are preset at a level of about 1.5 v/o.

16. The metalcutting insert according to claim 1 wherein said silicon carbide whiskers are present at a level of about 2.5 v/o.

17. A metalcutting insert comprising:
    a rake face;
    a flank face;
    a cutting edge at a juncture of said rake face and said flank face;
    and said metalcutting insert having an alumina based ceramic composition consisting of about 1.5–12.5 v/o silicon carbide whiskers, about 7.5 to 17.5 v/o $ZrO_2$, a magnesia addition added at a level of about 0.04 to 1 v/o and $Al_2O_3$ forming the remainder except for impurities, wherein at least 7 v/o of said composition is tetragonal zirconia, and wherein said silicon carbide whiskers and said zirconia are dispersed in a matrix formed of said alumina.

18. The metalcutting insert according to claim 17 wherein said silicon carbide whiskers are present at a level of about 2.5 to 11 v/o.

19. The metalcutting insert according to claim 18 wherein said zirconia is present at a level of about 9 to 16 v.o.

20. The metalcutting insert according to claim 19 wherein said tetragonal zirconia is present at a level of about 7.5 v/o.

21. The metalcutting insert according to claim 19 wherein said tetragonal zirconia is present at a level of about 8.0 v/o.

22. The metalcutting insert according to claim 19 wherein said silicon carbide whiskers are present at a level of about 2.5 to 7.5 v/o.

23. The metalcutting insert according to claim 22 wherein said zirconia is present at a level of about 9 to 16 v/o.

24. The metalcutting insert according to claim 23 wherein said tetragonal zirconia is present at a level of about 7.5 v/o.

25. The metalcutting insert according to claim 19 wherein said zirconia is present at a level of about 9 to 16 v/o.

26. The metalcutting insert according to claim 25 wherein said tetragonal zirconia is present at a level of about 7.5 v/o.

27. The metalcutting insert according to claim 25 wherein said tetragonal zirconia is present at a level of about 8.0 v/o.

28. The metalcutting insert according to claim 27 wherein said silicon carbide whiskers are present at a level of about 1.5 v/o.

29. The metalcutting insert according to claim 25 wherein said silicon carbide whiskers are present at a level of about 2.5 v/o.

30. The metalcutting insert according to claim 25 wherein said silicon carbide whiskers are present at a level of about 1.5 v/o.

31. The metalcutting insert according to claim 25 wherein said silicon carbide whiskers are present at a level of about 2.5 to 5 v/o.

32. The metalcutting insert according to claim 17 wherein said silicon carbide whiskers are present at a level of about 2.5 v/o.

33. The metalcutting insert according to claim 17 wherein said silicon carbide whiskers are present at a level of about 1.5 v/o.

34. The metalcutting insert according to claim 17 wherein said silicon carbide whiskers are present at a level of about 2.5 to 5 v/o.

35. A metalcutting insert comprising:
a rake face;
a flank face;
a cutting edge at a juncture of said rake face and said flank face;
said metalcutting insert having an alumina based ceramic composition comprising about 1.5–7.5 v/o silicon carbide whiskers, about 7.5 to 17.5 v/o zirconia, wherein said zirconia includes tetragonal zirconia in an amount effective to provide said cutting edge with a lifetime of at least 10 minutes when turning AISI 1045 steel having a hardness of about 190 to 200 BHN under the conditions of 1000 surface feet/minute, 0.025 inch/revolution and 0.0100 inch depth of cut, and wherein said silicon carbide whiskers and zirconia are dispersed in an aluminia based matrix.

36. The metalcutting insert according to claim 33 wherein said lifetime is at least about 12 minutes.

37. The metalcutting insert according to claim 36 wherein said silicon carbide whiskers are present at a level of about 1.5 v/o.

38. The metalcutting insert according to claim 36 wherein said silicon carbide whiskers are present at a level of about 2.5 v/o.

39. The metalcutting insert according to claim 33 wherein said lifetime is at least about 15 minutes.

40. The metalcutting insert according to claim 39 wherein said alumina based ceramic composition further comprises a magnesia addition added at a level of 0.03 to 3 v/o of said alumina based ceramic composition.

41. The metalcutting insert according to claim 40 wherein said silicon carbide whiskers are present at a level of about 2.5 to 5 v/o.

42. The metalcutting insert according to claim 39 wherein said silicon carbide whiskers are present at a level of about 2.5 to 5 v/o.

43. The metalcutting insert according to claim 39 wherein said silicon carbide whiskers are present at a level of about 1.5 v/o.

44. The metalcutting insert according to claim 39 wherein said silicon carbide whiskers are present at a level of about 2.5 v/o.

45. The metalcutting insert according to claim 35 wherein said silicon carbide whiskers are present at a level of about 2.5 to 7.5 v/o.

46. The metalcutting insert according to claim 45 wherein said zirconia is present at a level of about 9 to 16 v/o.

47. The metalcutting insert according to claim 35 wherein said zirconia is present at a level of about 9 to 16 v/o.

48. The metalcutting insert according to claim 47 wherein said silicon carbide whiskers are present at a level of about 2.5 to 5 v/o.

49. The metalcutting insert according to claim 48 wherein said alumina based ceramic composition further comprises a magnesia addition added at a level of 0.03 to 3 v/o of said alumina based ceramic composition.

50. The metalcutting insert according to claim 35 wherein said silicon carbide whiskers are present at a level of about 2.5 to 5 v/o.

51. The metalcutting insert according to claim 50 wherein said alumina based ceramic composition further comprises a magnesia addition added at a level of 0.03 to 3 v/o of said alumina based ceramic composition.

52. The metalcutting insert according to claim 33 wherein said alumina based ceramic composition further comprises a magnesia addition added at a level of 0.03 to 3 v/o of said alumina based ceramic composition.

53. The metalcutting insert according to claim 35 wherein said silicon carbide whiskers are present at a level of about 1.5 v/o.

54. The metalcutting insert according to claim 35 wherein said silicon carbide whiskers are present at a level of about 2.5 v/o.

55. A metalcutting insert comprising:
a rake face;
a flank face;
a cutting edge at a juncture of said rake face;

said metalcutting insert having an alumina based ceramic composition comprising about 1.5 to 37.5 v/o titanium carbide whiskers, and 1.5 to 7.5 v/o silicon carbide whiskers; about 7.5 to 17.5 v/o zirconia; wherein at least about 7 v/o of said composition is tetragonal zirconia; and wherein said titanium carbide whiskers, silicon carbide whiskers and zirconia are dispersed in an alumina based matrix.

56. The metalcutting insert according to claim 55 wherein titanium carbide whiskers are present at a level of about 10 to 30 v/o of said composition.

57. The metalcutting insert according to claim 56 containing at least 8 v/o tetragonal zirconia.

58. The metalcutting insert according to claim 55 containing at least 7.5 v/o tetragonal zirconia.

59. The metalcutting insert according to claim 55 wherein said silicon carbide whiskers are present at a level of about 2.5 to 7.5 v/o.

60. The metalcutting insert according to claim 59 wherein said zirconia is present at a level of about 9 to 16 v/o.

61. The metalcutting insert according to claim 55 wherein said zirconia is present at a level of about 9 to 16 v/o.

62. The metalcutting insert according to claim 61 wherein said silicon carbide whiskers are present at a level of about 2.5 to 5 v/o.

63. The metalcutting insert according to claim 55 wherein said silicon carbide whiskers are present at a level of about 2.5 to 5 v/o.

64. The metalcutting insert according to claim 55 wherein said alumina based ceramic composition further comprises a magnesia addition added at a level of 0.03 to 3 v/o of said alumina based ceramic composition.

* * * * *